3,082,150
ANTIBACTERIAL COMPOSITIONS AND METHODS OF USING SAME
John McNeill Sieburth, Kingston, R.I., assignor to Virginia Polytechnic Institute, Blacksburg, Va., a corporation of Virginia
No Drawing. Filed Aug. 16, 1960, Ser. No. 49,836
8 Claims. (Cl. 167—53)

This invention relates to certain water-soluble antibacterials in dosage unit form and to methods of treating domestic animals or birds for infections of the alimentary canal.

Most antibiotics for oral use in the past have been rather complex organic compounds and most of them have been enormously expensive even when their high activity is taken into consideration. The present invention is concerned with water-soluble antibacterials which have extremely low toxicity and which can be used particularly in the treatment of domestic animals or birds for infections of the alimentary canal. These compounds have the following type formula in which M stands for a non-toxic cation which forms water-soluble compounds:

$$CH_2=CHCO_2M$$

Water solubility is an important characteristic of the antibacterials of the present invention, acrylic acid and its non-toxic water-soluble salts. Water solubility is vital in treatments of infections in which the antibacterial is administered orally. The alimentary canal constitutes an aqueous medium and to the extent that there is any absorption into the blood stream this is also a phenomenon dealing with aqueous systems. The water-soluble antibacterials are particularly effective for such uses.

In addition to the general considerations of oral administration, the water-soluble antibacterials of the present invention have another important practical advantage. In the treatment of domestic animals by which there is included domestic birds such as poultry, it is often desirable to treat the animals, such as poultry flocks, by introducing the medicament into their drinking water. This is a very simple means which can be used by the medically unskilled farmer. While it is possible to administer the antibacterials of the present invention by mixture with feed, and this is included in the present invention, the water solubility of the antibacterials permits, in addition, the purely therapeutic treatment for acute infections which is made possible by their incorporation into the drinking water of the domestic animals. For long continued treatment, for example in low-grade chronic infections, the administration via the animal feed is advantageous. It is less suitable for the rapid treatment of acute infections. It is an advantage of the present invention that the water-soluble antibacterials are equally useful for administration in drinking water or other aqueous media or in animal feed.

A very important requirement of the present invention is that the antibacterials be not permitted to polymerize extensively. This is vital and here the antibacterials of the present invention, particularly the salts, are relatively stable against polymerization. Acrylic acid itself polymerizes more easily and while included is much less desirable. Compounds such as esters or amides of acrylic acid polymerize very readily and are insoluble in water, or do not have significant water solubility. Also, some of these other acrylic compounds are very toxic, whereas, the salts and acrylic acid itself have toxicities sufficiently low for safe use in unskilled hands. Of the salts sodium acrylate is preferred since it is as effective as any of these antibacterials and is the cheapest compound available. The invention, however, is not limited to using the sodium salt.

It is an advantage of the present invention that the acrylic acid compounds are active against both gram-positive and gram-negative organisms. Also, they are active against certain strains of organisms which have become resistant to certain other antibiotics such as penicillin, streptomycin and the like. The antibacterial activity on a weight basis of the acrylic acid compounds is much lower than that of many antibiotics such as penicillin, tetracycline, and the like. However, the low toxicity of the acrylic acid compounds permits larger doses and the enormous differential in price results in a high antibacterial activity based on price. When protected against polymerization the acrylic acid compounds, particularly the salts, such as sodium acrylate, are extremely stable and do not lose their activity on long continued storage. They are also not particularly sensitive to moderately elevated temperatures, whereas some antibiotic compositions are. This is of practical importance because it permits the shipment of the drugs of the present invention without temperature considerations. Even the high temperatures sometimes encountered in the holds of ships which may be as high as 50° C. do not result in decomposition of sodium acrylate or in loss of activity. This high stability is an important practical advantage of the present invention.

While the acrylic acid compounds have low toxicity as compared to some of the extremely powerful antibiotics which have been used in the past, and thus permit relatively large doses, there is a definite limit because if the dose is too large, toxic effects will arise. It is, however, an advantage of the present invention that the spread between doses which are effective and doses which are toxic is very great, and so, there is a very desirable wide therapeutic index and the antibacterial compositions of the present invention are, therefore, safe to use even in somewhat unskilled hands.

Because of the enormous difference in size of the domestic animals and birds absolute dosage units are not particularly meaningful; however, when the dosage unit is given in milligrams per kilogram of body weight per day, the ranges are much more comparable. It should still be understood that in the case of minimum figures there will be some difference depending on the size of the animal. Thus, for example when data are compared of 4–5 week old chicks with young pigs, there is a body weight difference of nearly 50 to 1. However, there is only a small difference in the minimum effective dosage based on body weight. In the case of the chicks, this is approximately 40 mg./kg.; in the case of the young pigs some results are obtainable even as low as 20–25 mg./kg. although the results are not optimal. Somewhat lower minimum dosages are possible with even larger animals but the limit is reached at approximately 10 mg./kg. The reason for the difference in lower limit of dosage is thought to lie in the fact that the area of the alimentary canal in relation to body weight is much higher in the chicks than in the larger domestic animals and evidently the lower limit is in some degree a function of surface concentration.

While the toxicity of the acrylic acid compound is low, there is a limit beyond which serious toxic effects are encountered. In the case of the chicks a lethal dose is about 20 g./kg. However, as therapeutic results do not increase significantly after a certain point is reached, for practical purposes an upper limit of approximately 300–500 mg./kg. represents as high a dose as gives additional benefit. In practical use the optimum results will range from 40 to about 200 mg./kg. This gives an enormous spread of therapeutic index and makes the acrylic acid compounds of the present invention thoroughly useful in practice for there are still no significant toxic effects with chicks at a dosage of 2,000 mg./kg.

As indicated above, the useful range of the acrylic acid compound comprises a daily dosage of from 10 mg./kg. of bodyweight to 1,000 mg./kg. of bodyweight. Stated otherwise, when the acrylate is administered by the preferred route, namely, via mixture with the feed as shown in Examples 3 and 4, this requires a concentration of drug in the diet of from .05–15 kilograms per ton of feed. The preferred daily dosage of from 40 to 200 mg./kg. of bodyweight is provided by a concentration of 0.18–3.0 kilograms per ton of feed.

The present invention will be illustrated in greater detail in conjunction with specific examples giving a bacterial spectrum in vitro together with examples in vivo. It should be understood that the application of the dosage is more or less immaterial. That is to say, the compositions containing the dosage unit of the acrylic acid compounds may be in fairly concentrated form or they may be given by mixing with the feed which the animal or bird is using. For ease in obtaining acceptance by the animal or bird and the additional safety in unskilled hands the dilution of the antibacterial by animal feed constituents has advantages. On the other hand, in the case of acute infections the cost and to a lesser extent the storage characteristics of the feed are less desirable. It is an advantage of the invention that it is extremely flexible and the best form of the composition for use by the veterinarian and by the individual livestock farmer can be chosen in each case.

EXAMPLE 1

Sodium acrylate was tested in vitro by determining the minimum concentration required to produce inhibition. The results are summarized in the following table:

Table 1

ANTIBACTERIAL SPECTRUM OF SODIUM ACRYLATE AT pH 6.5

Test organism:  Concentration to produce minimum inhibitory zone mg./ml.
Pasteurella multocida _____ 0.012
Staphylococcus aureus _____ 0.039 to 2.5
Corynebacterium pseudodiphtheriticum _____ 0.042
Salmonella gallinarum _____ 0.16
Arizona paracolon _____ 0.16
Bacillus pumilus _____ 0.19
Streptococcus faecalis _____ 0.24
Mycobacterium phlei _____ 0.24
Streptococcus agalactiae _____ 0.31
Mycobacterium smegmatis _____ 0.35
Sarcina ureae _____ 0.40
Corynebacterium paurometabolum _____ 0.46
Streptococcus pyogenes _____ 0.60
Pseudomonas aeruginosa _____ 0.73
Salmonella paratyphi A _____ 0.94
Alcaligenes faecalis _____ 0.99
Salmonella enteritidis _____ 1.25
Escherichia coli _____ 1.25 to 5.0
Proteus vulgaris _____ 1.25
Salmonella typhimurium _____ 1.63
Brucella abortus _____ 1.75
Salmonella pullorum _____ 2.12
Candida albicans _____ 2.37
Mycococcus spp. _____ 2.75
Micrococcus spp. _____ 3.25
Escherichia freundi _____ 3.75
Sarcina lutea _____ 4.0
Bacillus tinakiensis _____ 5.0
Proteus rettgeri _____ 5.0
Pseudomonas fluorescens _____ 6.0
Klebsiella pneumoniae _____ 7.5
Vibrio foetus _____ 8.0
Sarcina flava _____ 9.0
Proteus morganii _____ 10.0
Proteus mirabilis _____ 10.0
Corynebacterium hoagii _____ 12.0

EXAMPLE 2

The minimum inhibitory concentration of sodium acrylate compared to the more potent antibiotics is in milligrams rather than in microgram quantities. However, the salts of the acrylates are acid potentiated in the acidic digestive tract. Therefore, the in vivo activity is usually greater than the in vitro activity. The effect of an increased hydrogen ion concentration which results in acid potentiation is shown by the following table:

Table 2

MINIMUM INHIBITORY CONCENTRATION, mg./ml.

| pH | Escherichia coli | Salmonella typhimurium | Staphylococcus aureus | Streptococcus faecalis |
|---|---|---|---|---|
| 4.5 |  | 0.218 |  |  |
| 5.0 | 0.19 | 0.281 | 0.101 |  |
| 5.5 | .039 | 0.312 |  | 0.117 |
| 6.0 | .078 | 0.374 | 0.133 | 0.156 |
| 6.5 | 1.75 | 0.531 | 0.687 | 0.281 |
| 7.0 | 3.0 | 0.813 | 1.062 | 0.687 |
| 7.5 | 5.0 | 1.250 | 2.250 | 1.375 |
| 8.0 | 11.0 | 1.875 | 3.00 | 2.375 |
| 8.5 | 13.0 |  | 3.75 | 6.000 |

As is apparent from the above table, a decrease in one pH unit may yield a ten-fold increase in antibacterial activity. This is important as the gut of the animal may often be in the range pH 3.0 to 6.5, as in the case of poultry, for example.

EXAMPLE 3

The effectiveness of 1,000 p.p.m. of sodium acrylate in the feed on intestinal bacteria was tested in chickens. Escherichia coli was chosen. The chickens were divided into two groups, one receiving the sodium acrylate and the other the control. In each case the number of organisms on the average was determined on the basis of a gram of the contents of the organ in question. The results appear in the following table:

Table 3

| Organ | Control | Acrylate Treated |
|---|---|---|
| Crop | 1.25×10⁷ | <2×10³ |
| Gizzard | 2×10³ | <3×10³ |
| Duodenum | 1×10⁶ | <4×10² |
| Anterior Illeum | 5×10⁵ | <3×10² |
| Posterio Illeum | 3×10⁶ | <7×10³ |

It will be noted that except in the case of the gizzard where the organisms were very sparse the acrylate produced an enormous decrease. Even in the case of the gizzard there was a decrease to about ⅓.

EXAMPLE 4

A series of chicks of approximately 4 to 5 weeks of age were divided into four groups. The first received no treatment and were not infected. Their mortality was zero. The second group was infected with pleuropneumonia-like organisms referred to usually as PPLO and known to be one of the etiological agents which causes the very serious disease of poultry called "chronic respiratory disease." The mortality was 95% during 25 days. The third group was also infected with the same amount of PPLO but received 50 mg./kg. sodium acrylate per day via mixture with the feed. The mortality after 25 days was 35%. A fourth group was inoculated but received only 25 mg./kg. per day of sodium acrylate, the mortality of this group was also 35%.

It should be noted that apparently chronic respiratory disease is extremely sensitive to sodium acrylate as only 25 mg./kg. was sufficient to significantly reduce mortality following infection; whereas for most other organisms 40–50 mg./kg. are needed for good results.

EXAMPLE 5

A series of young pigs averaging 29 pounds and having generalized low infection intestinal flora were divided into two groups. One group received over 14 days 20 mg./kg. per day of sodium acrylate, the others were controls. The pigs receiving sodium acrylate showed complete control of undesirable intestinal flora as evidenced by a 22% greater gain in weight over the control group.

This test shows the effectiveness of sodium acrylate to control a low grade infection as opposed to the acute and fatal infections arising from inoculation of the PPLO organism in the chicks. As the infection was low grade of course none of the control pigs died and the efficacy of sodium acrylate was therefore determined by the improved weight gain.

EXAMPLE 6

On repeating Example 5 with additional acrylates, namely potassium acrylate, calcium acrylate, magnesium acrylate and zinc acrylate the results are substantially the same within an experimental error. In each case control of the low grade infection is noted.

I claim:

1. An antibacterial composition which comprises a nutritionally-balanced animal feed containing from 0.05–15 kilograms per ton of feed of a compound having the formula: $CH_2=CHCO_2M$ in which M is a non-toxic metal cation.

2. A composition according to claim 1 in which the compound is sodium acrylate.

3. A composition according to claim 1 which contains from 0.18–3.0 kilograms per ton of feed of a compound having the formula: $CH_2=CHCO_2M$ in which M is a non-toxic metal cation.

4. A composition according to claim 3 in which the compound is sodium acrylate.

5. A method of treating intestinal infections of microorganisms in domestic animals which comprises administering orally to the animals from 10 milligrams per kilogram of body weight to 1,000 milligrams per kilogram of body weight of a compound having the formula:

$$CH_2=CHCO_2M$$

in which M is a non-toxic metal cation.

6. A process according to claim 5 in which the oral dosage is from 20 milligrams per kilogram of body weight to 300 milligrams per kilogram of body weight.

7. A method of treating intestinal infection of microorganisms in domestic animals which comprises giving the animal orally from 10 milligrams per kilogram of body weight to a 1,000 milligram per kilogram of body weight of sodium acrylate.

8. A process according to claim 7 in which the dosage is from 20 milligrams per kilogram of body weight to 300 milligrams per kilogram of body weight.

References Cited in the file of this patent

UNITED STATES PATENTS 2,850,405    Bottoms _____ Sept. 2, 1958

OTHER REFERENCES

Sogo: Chem. Abst., vol. 28, 1934, page 27448.

Jenkins. The Chemistry of Organic Medicinal Products, second edition, 1941, John Wiley and Sons, London, England, page 219.